US00RE38735E

(19) United States
(12) Reissued Patent
Yao

(10) Patent Number: US RE38,735 E
(45) Date of Reissued Patent: May 17, 2005

(54) COMPACT PROGRAMMABLE PHOTONIC VARIABLE DELAY DEVICES

(75) Inventor: X. Steve Yao, Diamond Bar, CA (US)

(73) Assignee: General Photonics Corporation, Chino, CA (US)

(21) Appl. No.: 10/002,947

(22) Filed: Oct. 31, 2001

Related U.S. Patent Documents

Reissue of:
(64) Patent No.: 5,978,125
Issued: Nov. 2, 1999
Appl. No.: 08/564,920
Filed: Nov. 30, 1995

(51) Int. Cl.[7] ..... G02F 1/03; G02F 1/29
(52) U.S. Cl. ..... 359/256; 359/245; 359/259; 359/320
(58) Field of Search ..... 359/245, 250, 359/256, 259, 261, 263, 281, 282, 310, 316, 317, 320, 484, 494, 495, 496; 372/26

(56) References Cited

U.S. PATENT DOCUMENTS

| | | | |
|---|---|---|---|
| 3,302,028 A | 1/1967 | Sterzer | 359/256 |
| 3,684,350 A | 8/1972 | Wentz | 359/256 |
| 3,719,414 A | 3/1973 | Wentz | 359/256 |

(Continued)

OTHER PUBLICATIONS

E. Toughlian and H. Zmuda, "A photonic cariable RF delay line for phased array antennas", J. Lightwave Technol., vol. 8, pp. 1824–1828, 1990.

E. Toughlian, H. Zmuda, and P. Kornreich, "A deformable mirror–based beamforming system for phased array antennas", IEEE Photonics Technology letters, vol. 2, No. 6, pp. 444–446, 1990.

C.T. Sullivan, S.D. Mukherjee, J.K. Hibbs–Brenner, and A. Gopinath, "Switched time–delay elements based on AlGaAs/GaAs optical wave–guide technology at 1.32 mm for optically controlled phased array antennas", SPIE Proceedings, vol. 1703, pp. 264–271, 1992.

(Continued)

*Primary Examiner*—Loha Ben
(74) *Attorney, Agent, or Firm*—Fish & Richardson P.C.

(57) ABSTRACT

Optical variable delay devices for providing variable true time delay to multiple optical beams simultaneously. A ladder-structured variable delay device comprises multiple basic building blocks stacked on top of each other resembling a ladder. Each basic building block has two polarization beamsplitters and a polarization rotator array arranged to form a trihedron; Controlling an array element of the polarization rotator array causes a beam passing through the array element either going up to a basic building block above it or reflect back towards a block below it. The beams going higher on the "ladder"experience longer optical path delay. An index-switched optical variable delay device comprises of many birefringent crystal segments connected with one another, with a polarization rotator array sandwiched between any two adjacent crystal segments. An array element in the polarization rotator array controls the polarization state of a beam passing through the element, causing the beam experience different refractive indices or path delays in the following crystal segment. By independently control each element in each polarization rotator array, variable optical path delays of each beam can be achieved. Finally, as index-switched variable delay device and a ladder-structured variable device are cascaded to form a new device which combines the advantages of the two individual devices. This programmable optic device has the properties of high packing density, low loss, easy fabrication, and virtually infinite bandwidth. The device is inherently two dimensional and has a packing density exceeding 25 lines/cm$^2$. The delay resolution of the device is on the order of a femtosecond (one micron in space) and the total delay exceeds 10 nanosecond. In addition, the delay is reversible so that the same delay device can be used for both antenna transmitting and receiving.

60 Claims, 11 Drawing Sheets

U.S. PATENT DOCUMENTS

| | | | | |
|---|---|---|---|---|
| 4,461,543 | A | 7/1984 | McMahon | 359/320 |
| 5,251,057 | A | 10/1993 | Guerin et al. | 359/259 |
| 5,317,445 | A | 5/1994 | DeJule et al. | 359/250 |
| 5,373,393 | A | 12/1994 | DeJule et al. | 359/320 |
| 5,381,250 | A | 1/1995 | Meadows | 359/39 |
| 5,475,525 | A | 12/1995 | Tournois et al. | 359/245 |

OTHER PUBLICATIONS

N.A. Riza, "Transmit/receive time–delay beam forming optical architecture for phased array antennas", Appl. Opt., vol. 30, pp. 4594–4595, 1991.

A. Gutzoulis, K. Davis, P. Hrycak, and A. Johnson, "A hardware–compressive fiber–optic true time delay steering system for phased–array antennas", Microwave Journal, pp. 126–140, Sep. 1994.

R. Soref, "Programmable time–delay devices", Applied Optics, vol. 23, No. 21, pp. 3736–3739, 1984.

W. Ng, A. Walston, G. Tangonan, I. Newberg, and J.J. Lee, "Wideband fiber–optic network for phased array antenna steering", Electronics Letters, vol. 25, No. 21, pp. 1456–1457, 1989.

D. Dolfi, F. Michel–Gabriel, S. Bann, and J.P. Huignard, "Two–dimensional optical architecture for time–delay beam forming in a phased–array antenna", Optics Letters, vol. 16, No. 4, pp. 255–157, 1991.

B. Moslehi, K. Chau, and J. Goodman, "Fiber–optic signal processors with optical gain and reconfigurable weights", Proc. 4$^{th}$ Biennial Department of Defense Fiber Optics and Photonics Conf., McLean, Virginia, pp. 303–309, 1994.

D. Nortton, S. Johns, and R. soref, "Tunable wideband microwave transversal filter using high dispersive fiber delay lines", Proc. 4$^{th}$ Biennial Department of Defense Fiber Optics and Photonics Conf., McLean, Virginia, pp. 297–301, 1994.

COMPACT PROGRAMMABLE PHOTONIC VARIABLE DELAY DEVICES

Matter enclosed in heavy brackets [ ] appears in the original patent but forms no part of this reissue specification; matter printed in italics indicates the additions made by reissue.

This invention was made with Government support under a Contract awarded by NASA, and is subject to the provisions of Public Law 96-517 (35 U.S.C 202) in which the inventor is granted right to retain title. The government has certain rights in this invention.

*This is a broadening reissue application of the U.S. Pat. No. 5,978,125 which has been surrendered to the U.S. Patent and Trademark Office. Another broadening reissue application, No. 10/005,745, of the same U.S. Pat. No. 5,978,125 was filed on Nov. 2, 2001 and is currently pending.*

FIELD AND ORIGIN OF INVENTION

This invention pertains generally to the precision optical path length control, specifically to a photonic variable true time delay device for steering phased array radar, for constructing a transversal filter, and for controlling the optical path in optical interferometry.

BACKGROUND AND SUMMARY OF THE INVENTION

Phased array antennas have the important ability of beam steering without mechanical actuators. This feature is highly desirable for applications such as spacecraft, air craft, and mobile platforms where size and mass are restricted. The direction of a microwave (or millimeter wave) beam radiated from a phased array antenna is generally controlled by the relative phase distribution of microwave signals emitted by regularly spaced radiating elements. For a phased array of a wide instantaneous bandwidth, adjusting only the relative phase is not sufficient and so a relative time delay adjustment of the radiating elements must be introduced to avoid the beam pointing error known as squint, which results from the modification of the antenna phase pattern with changing frequency.

Conventional electronic beam forming systems for generating and delivering the requisite time delay and phase information are generally bulky, lossy, inefficient, and of narrow bandwidth. On the other hand, photonic beam forming offers the advantage of high packing density, wide signal bandwidth, light weight, immunity to electromagnetic interference, and remoting capability via optical fiber. Consequently, it has been under intensive investigation in the past few years and many photonic beam forming systems have been proposed and demonstrated. Photonic beam forming network use a lightwave carrier for the electrical signals of the radiating elements of the phased array, and provides the necessary time delay and phase information for beam steering.

For airborne and space-based phased arrays operating at mm-wave frequencies (20 GHz and above), the arrays are usually two-dimensional and a large number of array elements, typically a few thousand, are used. This requires that the beam forming network be two dimensional and have a very high packing density. In addition, the beam forming network must be reversible so that it can be used for both antenna transmitting and receiving. Furthermore, the total delay achievable of the delay network must be sufficiently large so that the maximum scanning angle of the phased array is adequate. Finally, as will be shown later, the delay resolution (the minimum step of delay change) must be fine enough (much less than the wavelength of the signal) to ensure that the angular resolution of the beam scanning is sufficient.

None of the proposed photonic beam forming networks to date meet all of the above requirements. The operation frequencies of the beam forming networks based on acousto-optic modulators (E. Toughlian and H. Zmuda, "A photonic variable RF delay line for phased array antennas," J. Lightwave Technol., vol. 8, pp. 1824–828, 1990) are limited to below 5 GHz and suffer from poor delay resolution, and therefore not adequate for mm-wave phased arrays. Path-switching time delay devices based on guided wave optics (C. T. Sullivan, S. D. mukherjee, M. K. Hibbs-Brenner, and A. Gopinath. "Switched time-delay elements based on AlGaAs/GaAs optical wave-guide technology at 1.32 mm for optically controlled phased array antennas," SPIE Proceedings, vol. 1703, pp. 264–21, 1992) are complicated, and are characterized by high loss, high cost, poor delay resolution, and one-dimensional geometry. The free-space path-switching time delay device (N. A. Riza, "Transmit/receive time-delay beam forming optical architecture for phased array antennas," Appl. Opt., vol. 30, pp. 4594–4595, 1991) shown in FIG. 1A is a two dimensional device of high packing density, and operates at high frequency with sufficient total delay. However, as shown in FIG. 1B, the delay resolution of the device is limited by the size of the vertical dimension d of the two dimensional delay array and equals to 2dn, where n is the refractive index of the required polarization beam splitting cube. For a d of 10 cm and a n of 1.5, the resulting delay resolution is 30 cm and is much too large for mm-wave antennas. In addition, presently the path-switched true time delay has a non-optimized design, making it bulky, expensive, and difficult to manufacture.

Even for narrow bandwidth phased arrays where true time delay is not necessary, a compact, two dimensional, and programmable phase shifter with high phase-shift resolution is highly desirable. Such a phase shifter can reduce the size and weight, and increase the pointing accuracy of the phased array radar.

Another important application of two dimensional true time delay device is in transversal filters (B. Moslehi, K. Chau, and J. Goodman, "fiber-optic signal processors with optical gain and reconfigurable weights," Proc. 4th Biennial Department Of Defense Fiber Optics and Photonics Conf., McLean, Va. 1994, pp. 303–309 and D. Nortton, S. Johns, and R. Soref, "Tunable wideband microwave transversal filter using high dispersive fiber delay lines," Proc. 4th Biennial Department Of Defense Fiber Optics And Photonics Conf., McLean, Va., 1994, pp. 297–301). In such a filter, a microwave or mm-meter wave signal is splitted into many branches and then recombined after the signal in these branches experiences different delays. For a certain set of delays, only the signal with a right frequency will add in phase and exit the beam combining junction with minimum loss. Other frequencies will destructively interfere and suffer severe loss—a bandpass filter is formed. By changing the delay arrangements, the center frequency of the pass band will also change, creating a dynamically tunable filter often referred to as transversal filter. Studies indicate that the bandwidth of the filter is inversely proportional to the number of branches and the frequently tuning resolution is proportional to the delay resolution of the branches. Therefore, a compact, two dimensional, and programmable true time delay with high delay resolution is ideal for constructing such a filter.

Yet another application of a variable delay line with high delay resolution is in optical interferometry, and in auto- and cross-correlation measurements of optical pulses. Presently, variable delay is accomplished by the combination of various forms of mechanical translation and is fine tuned by piezoelectric transducer. Because such a delay line involves mechanical moving parts, it is generally bulky, heavy, difficult to align, and less reliable. In addition, because the piezo-electric transducer suffers from hysteresis and temperature dependent drift, active control using feedback servo loop is required, resulting in a complicated system.

OBJECTS AND ADVANTAGES

Accordingly, it is an object of this invention to provide a two dimensional and variable true time delay device for phased array radar and for transversal filter applications. The device has the properties of high packing density, low loss, easy fabrication, fast delay variation, and virtually infinite bandwidth. The delay resolution of the device is sufficiently fine for accurate beam steering, and the total delay is adequately large to cover desired scanning angles. This device can be simplified to a phase-shifter beam former for phased arrays of narrow bandwidth, where true time delay is not necessary.

An other object of this invention is to provide a variable delay line which has no moving parts, no hysteresis, and no temperature dependent drift for applications in optical interferometry and optical pulse auto- and cross-correlationl measurements, and in other applications where a precision variable time delay is required.

Yet another object of this invention is to provide a manufacturing method for the mass production of the variable true time delay.

Further objects and advantages of this invention will become apparent from a consideration of the ensuring description and drawings.

REFERENCE NUMBERS IN DRAWINGS

| | |
|---|---|
| 20 | Optical beam |
| 20A | Reverse direction optical beam |
| 22 | 90° polarization rotator array |
| 24L | Left Polarization Beamsplitter (PBS) |
| 24R | Right PBS |
| 26 | Corner reflector |
| 27A | Horizontal polarizer |
| 27B | Vertical polarizer |
| 28L | Left polarization rotator |
| 28R | Right polarization rotator |
| 30A | Horizontal Polarization |
| 30B | Perpendicular polarization |
| 32 | Switch |
| 34 | Control signal |
| 36 | External polarization rotator |
| 38L | Left external PBS |
| 38R | Right external PBS |
| 40 | Birefringent crystal |
| 42 | Polarization rotator |
| 44 | Electrodes |
| 46 | Laser array |
| 48 | Microwave signal |
| 50 | Photodetector array |
| 52 | Laser source |
| 54 | Collimating lens |
| 56 | Grid amplifier |
| 58 | Radiating microwave beam |
| 60 | Electrical signal combiner |
| 62 | Left laser array |
| 64 | Left collimating lens array |
| 68L | Left external polarization rotator array |
| 68R | Right external polarization rotator array |
| 70 | Left focusing lens array |
| 72 | Left photodetector array |

-continued

| | |
|---|---|
| 74 | Right focusing lens array |
| 76 | Right photodetector array |
| 78 | Left collimating lens array |
| 80 | Right diode laser array |
| 82 | Focusing lens |
| 84 | Photodetector |
| 86A | Upper corner reflector array |
| 86B | Lower corner reflector array |
| 88A | Upper lens array |
| 88B | Lower lens array |
| 90A | Upper polarization rotator array |
| 90B | Lower polarization rotator array |
| 92 | Birefringent crystal slabs |
| 94 | Voltage |
| 96 | Microlens |
| 98 | Insulating layers |

DESCRIPTION OF PREFERRED EMBODIMENTS

Figure 2A:
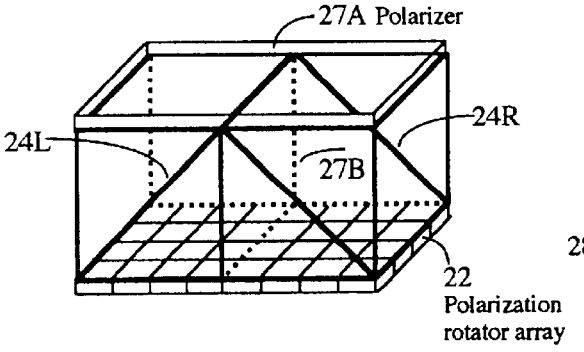
FIG. 2A shows the basic building block of an embodiment of this invention for improving the path-switched variable delay device.
Figure 2B:
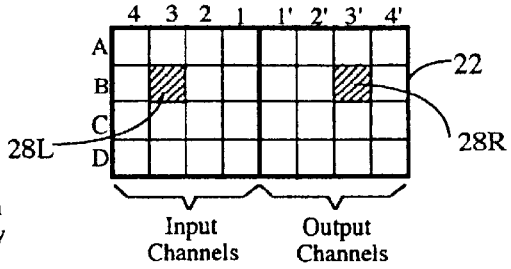
FIG. 2B shows the polarization rotator array for controlling the state of polarization in each channel.
Figure 2C:
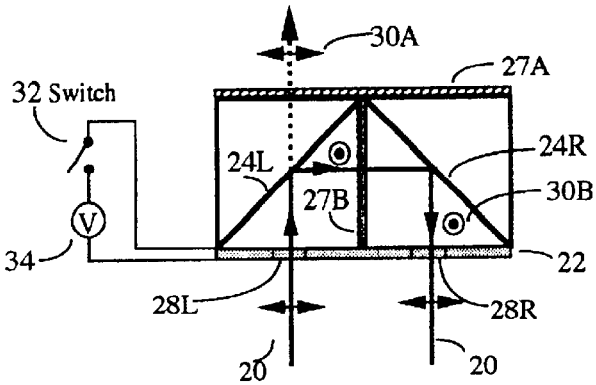
FIG. 2C is a cross section view of the basic building block, showing two different optical paths.

Referring to FIG. 2A, the basic building block of a ladder-structured variable delay unit of this invention consists of a polarization rotator array 22, two polarization beamsplitters (PBS) 24L and 24R, an optional horizontal polarizer 27A, and an optional vertical polarizer 27B. Polarization rotator array 22 is shown in FIG. 2B and it may comprise of liquid crystal polarization rotators, magneto-optical polarization rotators, or electrooptical polarization rotators. In the array, each pair of rotators 28L and 28R defines a signal channel and can be independently controlled. The pair should always be in the same state. For example, rotators (B,j) and (B,j') in FIG. 2B should be "on" or "off" simultaneously, where j and j' are coordinate integers. All channels in the block share the same polarization beamsplitters and polarizers. As shown in FIG. 2C, when a switch 32 and a control signal 34 activate a polarization rotator 28L, a horizontal polarization state 30A of an incoming light beam 20 is rotated 90 degrees to a perpendicular polarization 30B, causing the beam to be reflected by polarization beamsplitters 24L and 24R, and going toward the output. After passing a corresponding polarization rotator 28R at the output side, polarization state 30B of beam 20 is rotated back to polarization state 30A. The block is called in "reflecting state." On the other hand, when switch 32 and control signal 34 de-activate polarization rotator 28L, polarization state 30A of beam 20 is unchanged and the beam will pass polarization beamsplitter 24L, going toward another basic building block. The block is called in "passing state." The optional polarizers 27A and 27B can be used to minimize the polarization cross-talk between the "reflecting state" and the "passing state."

Figure 2D:
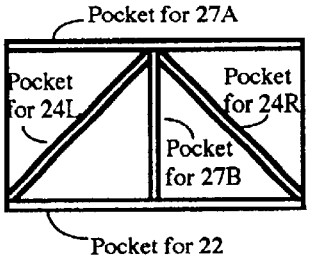
FIG. 2D shows an injection molded building block with pockets molded for different components.

To lower manufacturing cost, each building block can be injection-molded using glass, acrylic, or other types of materials. As illustrated in FIG. 2D, slots for polarization beamsplitters 24L and 24R, polarizers 27A and 27B, and polarization rotator array 22 are pre-molded on a glass (or plastic) block. When the unit is assembled, polarization rotator array 22, polarization beamsplitters 24L and 24R, and polarizers 27A and 27B can be simply dropped into the slots and then affixed in the slots using some epoxy that is index-matched to the building block. To further decrease the optical loss caused by the attenuation of the molding material, the optical path of each channel can be made hollow. This injection molding process is especially important for mass-production of the delay units.

Figure 3A:
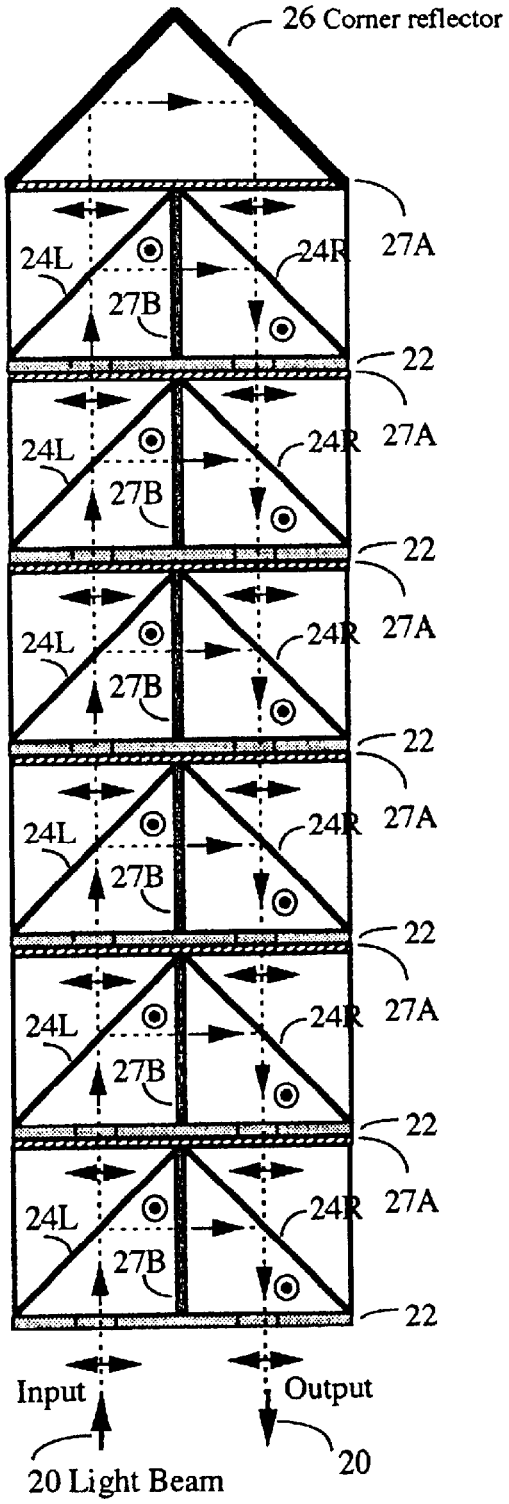
FIG. 3A shows a ladder-structured variable delay device by stacking many basic building blocks on top of each other.

The ladder-structured variable delay device is constructed by stacking multiple basic building blocks on top of each other, as shown in FIG. 3A. Whenever the beam encounters a basic block in reflecting state, it will be directed toward the output. For example, if the ith block is in reflecting state but all the blocks before it are in passing state, the total delay ΔL of the unit is $$\Delta L=2(i-1)nh, \tag{1}$$

where n and h are the refractive index and height of the basic building block respectively. The smallest delay increment is thus.

$$\Delta l=2nh \tag{2}$$

Figure 1A:
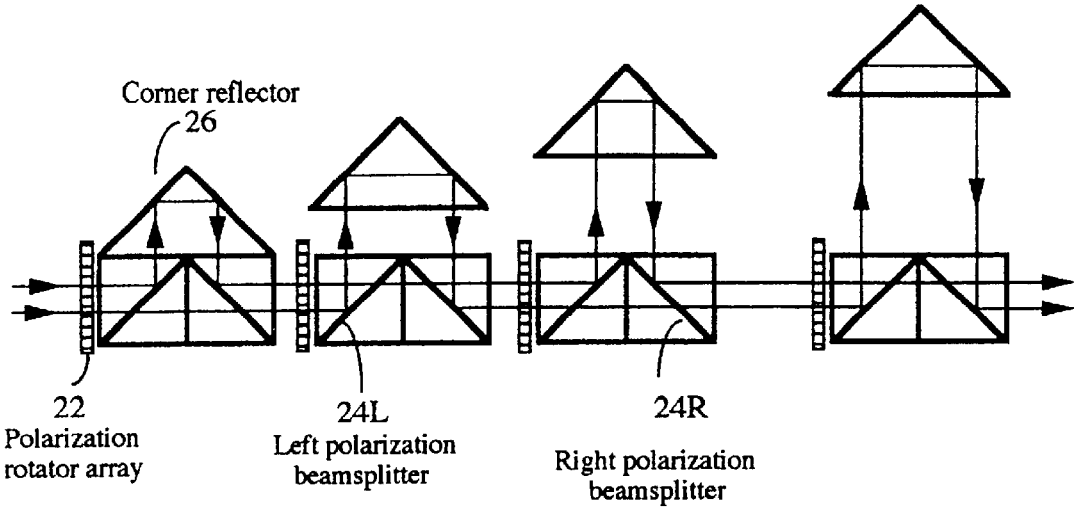
Fig. 1A PRIOR ART
FIG. 1A is a schematic of a prior art path-switched variable delay device.
Figure 1B:
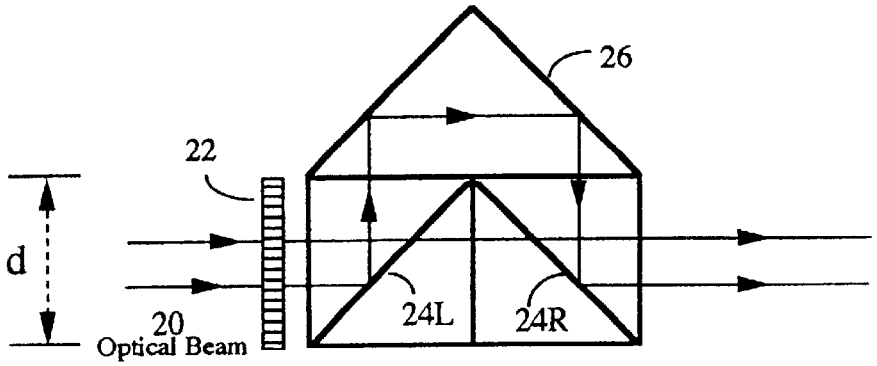
Fig. 1B PRIOR ART
FIG. 1B shows that the delay resolution of the prior art two-dimensional path-switched variable delay device is limited by the vertical dimension of the device.

Because the delay unit closely assembles a ladder, the structure of the delay unit is referred to as "ladder" construction. This structure is more compact than that of the conventional path switched delay shown in FIG. 1. The ladder structure is more suited for mass production and therefore less expensive to manufacture.

Figure 3B:
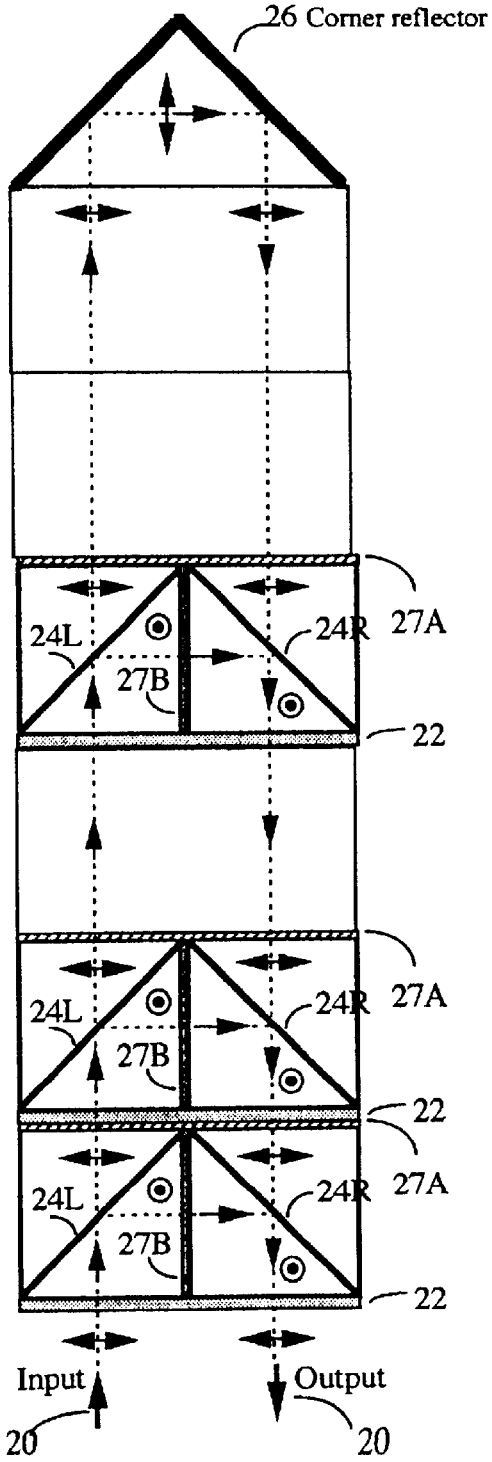
FIG. 3B shows a binary ladder-structured variable delay device that requires fewer basic building blocks.

To minimize the number of basic building blocks used in a ladder-structured variable delay device, the basic building blocks can be arranged in a binary fashion such that the distance between two consecutive blocks increases by a factor of 2, as shown in FIG. 3B. Let M be the total number of the blocks used (or bits), then the maximum value of the delay generated is:

$$\Delta L_{max}=(2^0+2^1+2^2+\ldots 2^{M-1})\Delta l=(2^M-1)\Delta l \tag{3}$$

where $\Delta l \equiv 2nh$ is the smallest delay increment. By properly adjusting the polarization state of the light beam in each block, any time delay in the range of Δl to $\Delta L_{max}$ can be obtained with a resolution (or delay increment) of Δl.

Figure 3C:
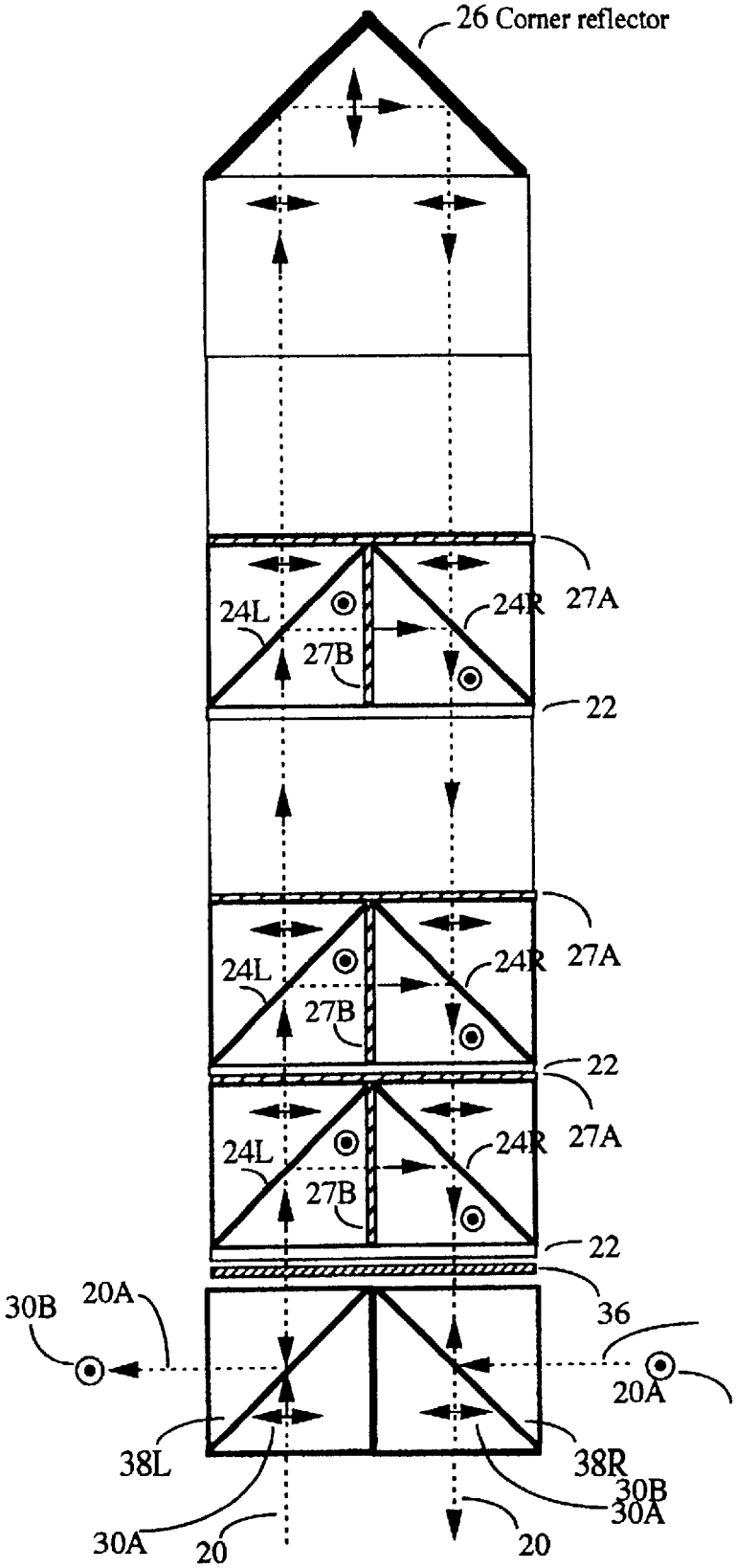
FIG. 3C shows a scheme to allow the ladder-structured variable delay device to operate in both directions.

The ladder-structured variable delay device can be made to operate bidirectionally by placing an external polarization beamsplitter 38L at left end of the device, another external polarization beamsplitter 38R at right end of the device, and an external large area polarization rotator 36 covering both the left and right ends, as shown in FIG. 3C. For left to right operation, an optical beam 20 having a horizontal polarization 30A enters the device from left external polarization beamsplitter 38L. External polarization rotator 36 is de-activated to allow optical beam 20 passing through left external polarization beamsplitter 38L and entering the delay device. On the other hand, for right to left operation, an optical beam 20A having a perpendicular polarization 30B enters the device by reflecting off right external polarization beamsplitter 38R. External polarization rotator 36 is activated to rotate perpendicular polarization 30B to horizontal polarization 30A before entering the device. When optical beam 20B reaches the left side of the delay device, external polarization rotator 36 automatically rotates horizontal polarization 30A back to perpendicular polarization 30B so that optical beam 20A exits the delay device by reflecting off left external polarization beamsplitter 38L.

Figure 4A:
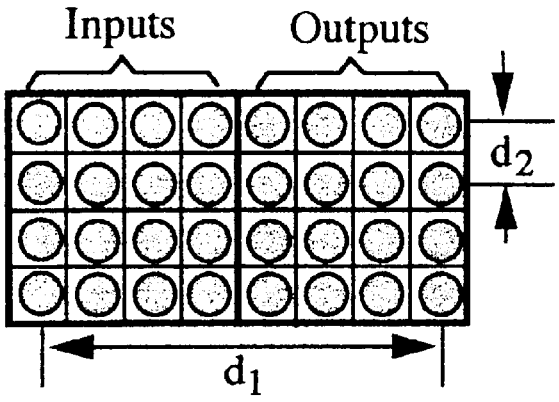
FIG. 4A is a bottom view of the variable delay device of FIG. 3, showing that packing more channels in the horizontal direction worsens the delay resolution of the device.
Figure 4B:
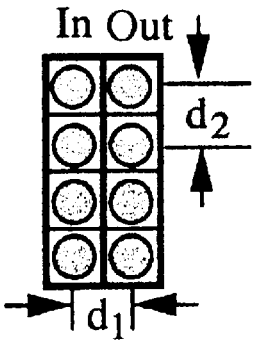
FIG. 4B shows a one dimensional ladder-structured variable delay device.
Figure 4C:
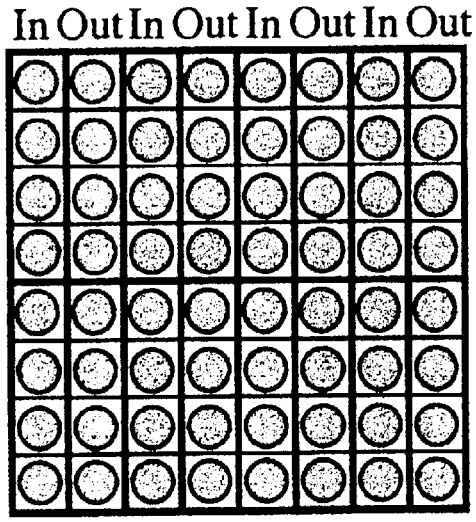
FIG. 4C shows packing many one dimensional ladder-structured variable delay devices together creates a two dimensional device with high packing density and good delay resolution.

FIG. 4A is a bottom view of the ladder-structured delay device described above and the delay resolution is limited by the horizontal dimension $d_1$. To improve the delay resolution, $d_1$ should be reduced. The minimum $d_1$ equals to twice of the beam size of the light beam, at which the number of channels in the horizontal direction reduce to one, as shown in FIG. 4B. Consequently, the 2-D delay device reduces to a 1-D delay device. However, many of such 1-D delays can be stacked together to form a high packing density of 2-D device, as shown in FIG. 4C. Unlike the 2-D delay of FIG. 2, the input and output channels are interlaced.

Accordingly, the ladder construction of this invention provides compactness and high packing density. The basic building block is simple and the complete unit consists of many basic building blocks that are stacked together. In addition, two or more units can be cascaded to further increase delay range. Because liquid crystals are used to control the relative delay of each channel, both control voltage and power consumption are low. By injection molding the structure of the device with glass or plastic, the fabrication cost can be greatly reduced. Because the passing states and the reflecting states have orthogonal polarizations, high delay isolation (defined as the optical power of wanted delay divided by the optical power of unwanted delay) is readily achievable with the insertion of polarizers. Finally, the optical loss of the device is low.

The delay resolution of the path switched delay described above is not fine enough for millimeter waves applications, where the delay resolution must be much less than 1 mm. The following describes an index switched variable delay device for achieving high delay resolution for mm wave and other applications where high delay resolution is required.

Figure 5A:
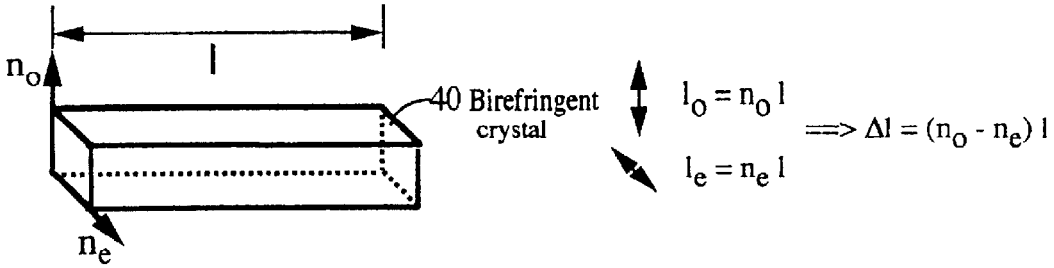
FIG. 5A shows a basic unit of an index-switched variable delay device.

FIG. 5A shows the basic unit of the index-switched variable delay device. The basic unit consists of a birefringent crystal segment 40 cut along the principal axes (X,Y,Z) of the crystal with the light beam propagating along the X axis (or Y axis). Input light beam 20 is polarized either in the Z direction or in the Y (or X) direction (the two principal directions of the crystal). The Y (or X) polarized beam experiences a refractive index of $n_o$ and the Z polarized beam experiences a refractive index of $n_e$. If the polarization of the light beam is rotated 90°, it will experience a delay difference of $\Delta l=(n_e-n_o)l$, where l is the length of the crystal segment.

Figure 5B:
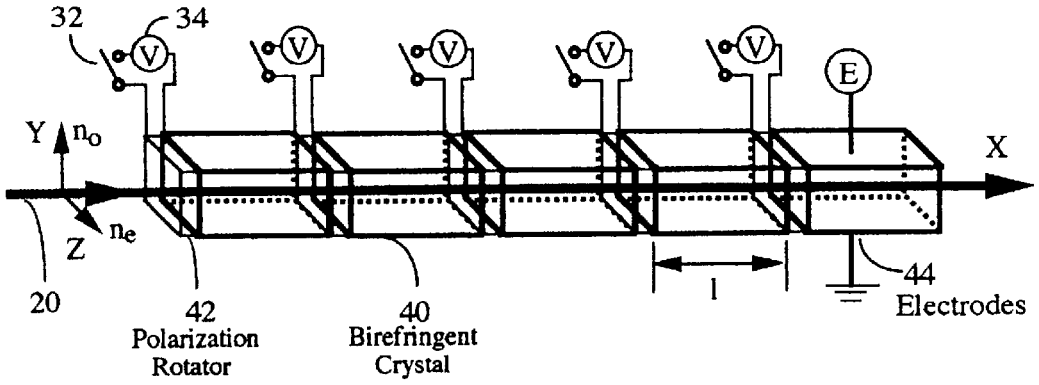
FIG. 5B shows a single channel of an index-switched variable delay device.

A delay line can be constructed by putting many such crystal segments together in a linear array, as shown in FIG. 5B. A polarization rotator 42 is sandwiched between two neighboring segments to control the beam's polarization states. Polarization rotator 42 can be a liquid crystal, a magneto-optic, or an electro-optic element. It is evident from FIG. 5B that the time delay of the beam can easily be altered by changing beam's polarization in each segment so that the refractive index the beam experiences will change. We call this method index-switching technique. To obtain even finer delay resolution, a pair of electrodes 44 may be placed across a birefringent crystal segment for applying an electrical field and changing the refractive index of the crystal via the electro-optic (or Pockel's) effect.

Figure 5C:
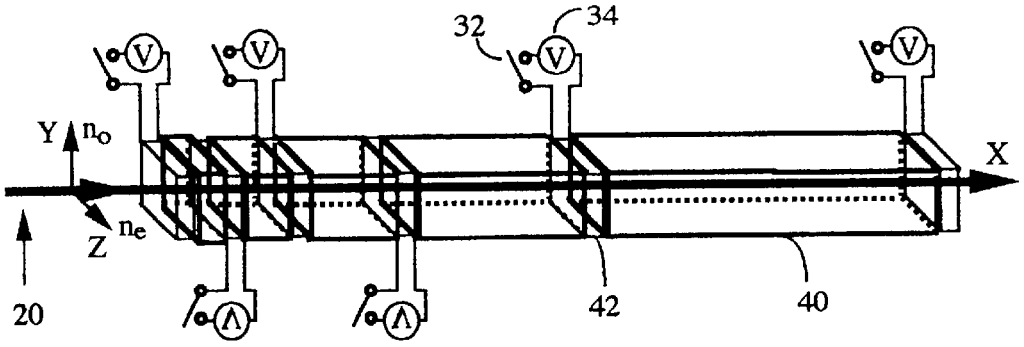
FIG. 5C shows a single channel of an index-switched binary variable delay device.

To minimize the number of polarization rotators in the device, the lengths of the crystal segments [increases] *increase* successively by a factor of 2, as shown in FIG. 5C. The relative optical path delay Δl between the two polarization states in the smallest segment of length l (the least significant bit) is $$\Delta l=(n_e-n_o)l. \tag{4}$$

Let M be the total number of crystal segments (or bits), then the maximum value of the delay generated is:

$$\Delta L_{max}=(2^0+2^1+2^2+\ldots 2^M-1)\Delta l=(2^M-1)\Delta l \tag{5}$$

By properly adjusting the polarization state of the light beam in each segment 40, any optical path delay in the range from Δl to $\Delta L_{max}$ can be obtained with a resolution (or delay increment) of Δl. Because the length of each crystal segment 40 can be tightly controlled, the accuracy of the device can be very high.

Several delay lines of the design described above can be densely packed in two dimensions to form a compact variable delay device. However, instead of cutting crystal into narrow strips, large area crystal segments 40 and polarzation rotator arrays 22 (spatial light modulators) are used to construct the multiple channel delay device, as shown in FIG. 6. Here polarization rotators in all polarization rotator arrays are aligned element by element and the size of each channel is determined by the size of the rotators. For 2 mm channel spacing, the packing density of the device is 25/cm$^2$. Such a channel spacing is easily attainable in practice, considering that a 1.4 mm diameter Gaussian beam with 1 $\mu$m wavelength has a Rayleigh range of 1.54 meters.

Figure 6A:
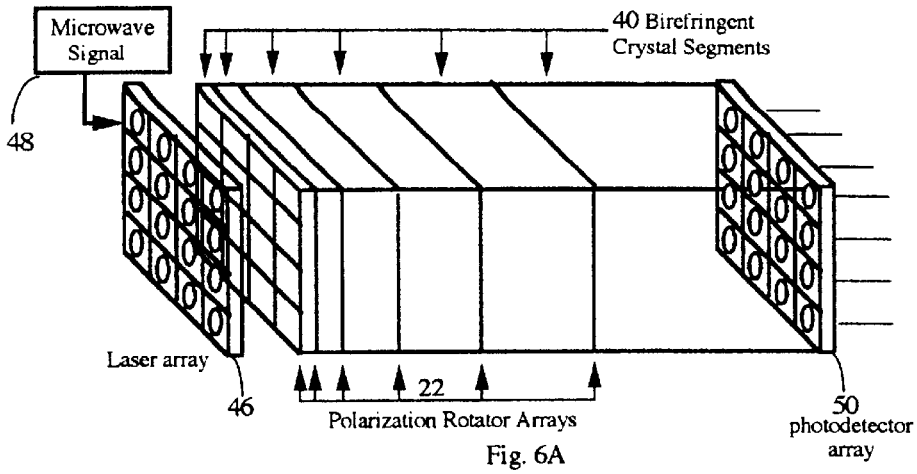
FIG. 6A shows a two dimensional construction of an index-switched variable delay device.
Figure 6B:
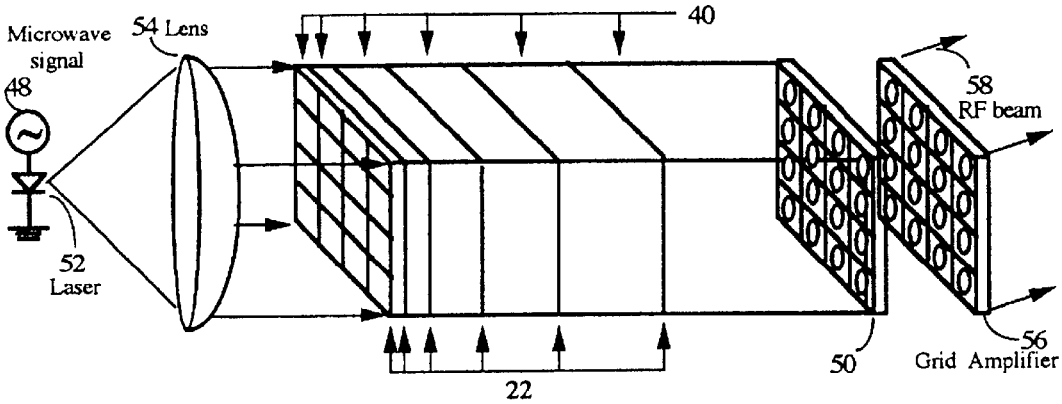
FIG. 6B shows a two-dimensional binary construction of an index-switched variable delay device.

In FIG. 6A, the input light beams are emitted from a diode laser array 46 with each laser beam collimated by a microlens. Lasers in laser array 46 are modulated by a microwave or RF signal 48. At the output end, each beam will be focused to a photodector on a detector array 50 by a microlens in front of each phtotodetector. The photodectors will convert the optical signals into microwave or RF signals with proper delays between the channels encoded by the delay device. In FIG. 6B, a single laser 52 is modulated by a microwave or RF signal 48. The laser beam is then expanded by a lens 54 and passes through the delay device. At the output end, each microlens in front of each photodetector focuses the light in the corresponding channel to the corresponding photodetector on detector array 50. The converted microwave or RF signals from all channels then incident on to a grid amplifier 56 and radiate away. The radiation angle of the resulting microwave or RF beam 58 is controlled by the relative delay relations between the delay channels.

Figure 6C:
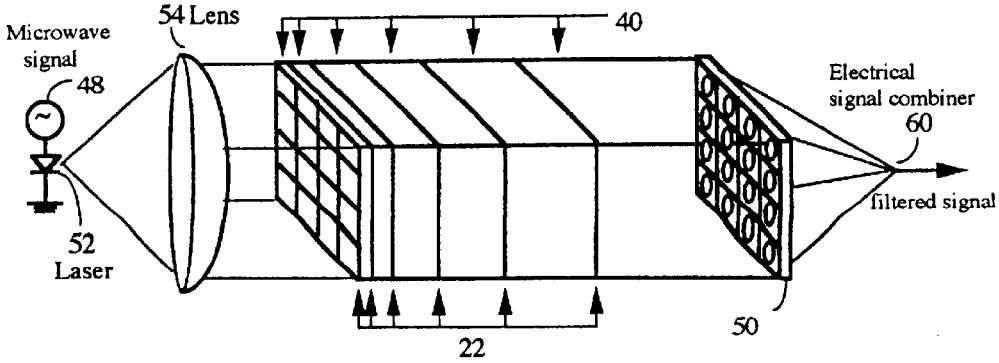
FIG. 6C shows a tunable transversal filter constructed using a two dimensional index-switched variable delay device.

FIG. 6C shows a tunable transversal filter constructed by a two dimensional index switched variable delay device. In this filer, a microwave or millimeter wave signal 48 is used to modulate a laser 52. The laser beam is expanded and passes through a two dimensional index switched variable delay device. Different portions of the beam defined by each element of the polarization rotator arrays will experience different delays. At the output end, each microlens in front of each photodetector will focus each corresponding portion of the beam to the corresponding photodetector on detector array 50 to convert the modulated light back to the microwave or mm-wave signal. All the microwave or mm-wave signals from all the photodetectors will be summed in an electrical signal combiner 60. For a certain set of delays, only the signal with a right frequency will add in phase and exit the beam combining junction with minimum loss. Other frequencies will destructively interfere and suffer severe loss—a bandpass filter is formed. By changing the delay arrangements, the center frequency of the pass band will also change, creating a dynamically tunable filter. Because a large number of signal channels are densely packed together, the resulting filter has a narrow bandwidth. Because the delay resolution of the index switched delay device is high, the frequency tuning resolution is also high. In addition, the fast speed of changing the delay arrangement makes tuning the filter very fast. Similar tunable filter can also be constructed with a ladder-structured optical variable delay device described earlier.

Figure 7A:
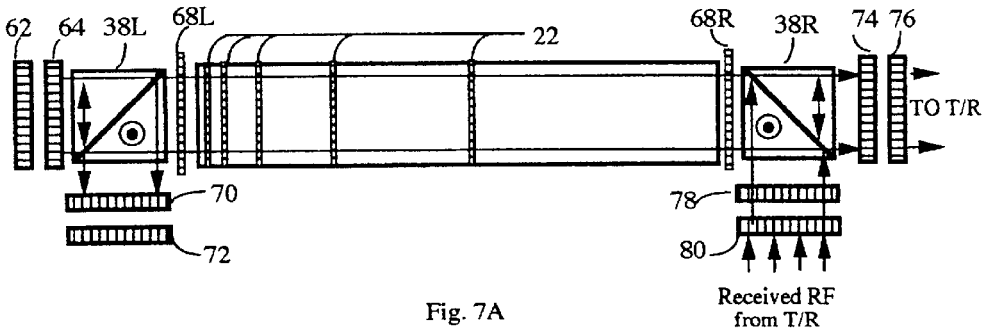
FIG. 7A shows a first implementation to allow the index-switched variable delay device to operate in both directions.
Figure 7B:
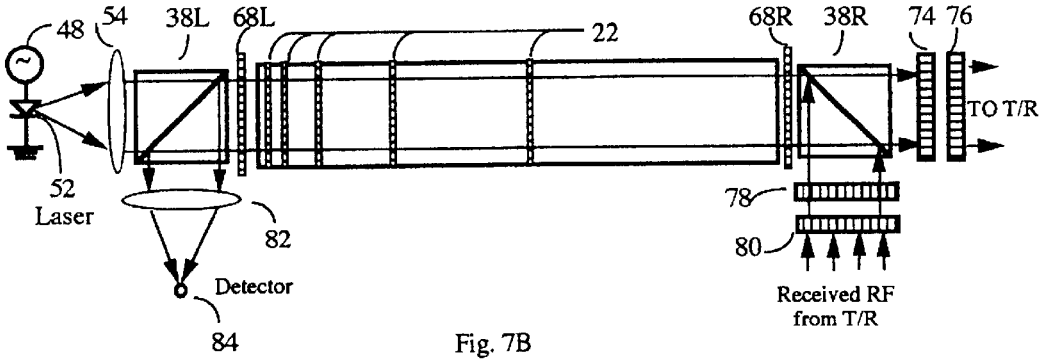
FIG. 7B shows an alternative implementation to allow the index-switched variable delay device to operate in both directions.

The index switched delay device can be used for both transmitting and receiving operations. As shown in FIGS. 7A and 7B, for the bi-directional operation, an external polarization beamsplitter (PBS) 38L and an external polarization rotator array 68L are placed at the left hand side of the device. Similarly, a second external PBS 38R and a second external polarization rotator array 68R are placed at the right hand side. Laser beams from the left hand side are polarized in the plane of the paper and passes through left PBS 38L. On the other hand, laser beams from the right hand side are polarized perpendicular to the plane of the paper and reflect off right PBS 38R.

In FIG. 7A, the left laser transmitter includes a left diode laser array 62 and a left collimating lens array 64 which collimates light from each laser diode. The left receiver includes a left photodetector array 76 and a left focusing lens array 74 which focus light from each channel to a corresponding photodetector on detector array 76. Similarly, the right laser transmitter includes a right diode laser array 80 and a left collimating lens array 78 which collimates light from each laser diode on laser array 80. The right receiver includes a left photodetector array 72 and a left focusing lens array 70 which focus light from each channel to a corresponding photodetector on left photodetector array 72. In FIG. 7B, the left laser transmitter contains only a single laser 52 and a collimating lens 54. The left side receiver consists of a single detector 84 and a focusing lens 82 that focus light from all channels to the photodetector. The laser beams transmitted from the right laser array are assumed to be incoherent.

When in the transmitting mode, left external polarization rotator array 68L is inactive. However, right external polarization rotator array 68R is such programmed that it always brings the polarization of light beams in each channel back to be in the plane of the paper after the delay device. This assures that light beams of all channels will pass PBS 38R and be received by right photodetector array 76. A left focusing lens array 74 is placed before left photodetector array 76 to focus light of each individual channel to a corresponding detector on left photodetector array 76. When in the receiving mode, right external polarization rotator array 68R is inactive. However, left polarization rotator array 68L is such programmed that it always brings the polarization of light beam in each channel back to be perpendicular to the plane of paper after the delay device. This assures that all channels will reflect off PBS 38L and be received by a detector array 72, as in FIG. 7A, or a detector 84 as in FIG. 7B.

The same concept can also be used to make phase shifters for phase array antennas with narrow bandwidth where true time delay is not necessary. For example, an 8. GHz (X-band) carrier has a wavelength of 3.75 cm. To obtain a total phase shift of $2\pi$ for such a carrier, a total length of only 13 cm of Rutile crystal per channel is required. For a Ka band carrier of wavelength of 0.75 cm (40 GHz), only 2.6 cm Rutile crystal per channel is required.

TABLE I

| | $n_o - n_e = \Delta l/l$ | Crystal for 1 cm delay |
|---|---|---|
| Orpiment ($As_2S_3$) | 0.4 | 2.5 cm |
| Geikelite ($MgTiO_3$) | 0.36 | 2.78 cm |
| Tellurite ($TiO_2$) | 0.35 | 2.86 cm |
| Prousite | 0.29 | 3.45 cm |
| Rutile ($TiO_3$) | 0.287 | 3.48 cm |
| $Ag_3AsS_3$ | 0.28 | 3.57 cm |
| Calcite | −0.172 | 5.81 cm |
| $LiNbO_3$ | −0.086 | 11.63 cm |
| Quartz | 0.0091 | 110 cm |
| PM Fiber | $\sim 6 \times 10^{-4}$ | ~1667 cm |

Table I [listed] *lists* the birefringence of potential birefringent materials for fabricating the proposed delay lines. Note that different crystals may be used together to construct a delay line: a crystal with small birefringence can be used to make segments of small delays (less significant bits) and a crystal with large birefringence can be used to make segments of large delays (more significant bits).

The maximum delay $\Delta L_{max}$ required of a beam forming network of a phased array antenna with N×N elements is $$\Delta L_{\max} = (N-1)d_{\max}\sin|\theta_{\max}| = \frac{(N-1)\lambda\cdot\sin|\theta_{\max}|}{(1+\sin|\theta_{\max}|)} \tag{6}$$

where $\theta_{max}$ is the maximum beam scanning angle, $\lambda$ is the wavelength of the carrier (microwave) signal of the phased array, and $d_{max}\equiv\lambda/(1+\sin|\theta_{max}|)$ is the maximum array spacing allowed before higher order diffraction degrade the antenna gain.

To achieve an angular beam scanning resolution of $\Delta\theta$, the delay resolution or the minimum path delay between the two adjacent elements $\Delta l$ is required to be $$\Delta l = \frac{\lambda\cdot\cos\theta_{\max}\Delta\theta}{(1+\sin|\theta_{\max}|)}. \tag{7}$$

Table II lists the values of required maximum delay $\Delta L_{max}$ and delay resolution $\Delta l$ for a phased array with $\lambda$=0.75 cm (40 GHz), N=64, and $\Delta\theta$=1°. The corresponding crystal lengths for the maximum and the minimum delays are also listed. For example, for the case of $\theta_{max}$=30°. $LiNbO_3$ crystal of length 0.87 mm can be used to make the segment of the smallest delay of 76.5 $\mu$m and the Rutile crystal of the total length of about 55 cm can be used to make other larger delay segments that have a total delay of 15.75 cm. In the table, the number of bits M is calculated using $M=\log_2(1+\Delta L_{max}/\Delta l)$.

TABLE II

| | $\theta_{max}$ = 5° | $\theta_{max}$ = 10° | $\theta_{max}$ = 30° | $\theta_{max}$ = 60° |
|---|---|---|---|---|
| $\Delta L_{max}$ | 3.78 cm or 5.04 $\lambda$ | 7 cm or 9.33 $\lambda$ | 15.75 cm or 21 $\lambda$ | 21.93 cm or 29.24 $\lambda$ |
| $L_{max}$ (Rutile) | 13.48 cm | 24.4 cm | 55 cm | 76.4 cm |
| $\Delta l$ | 0.12 mm | 0.11 m | 0.0756 mm | 0.035 m |
| l ($LiNbO_3$) | 1.4 mm | 1.3 mm | 0.87 mm | 0.41 mm |
| M No. of bits | 7 | 8 | 11 | 12 |

It should be noted that Rutile has excellent optical and physical properties: it is transparent to light from 500 nm to 5 $\mu$m and its birefringence ($n_e-n_o$) remains almost unchanged from 430 nm to 4 $\mu$m. It has a density of 4.26 g/cm$^3$, a melting point of 2093° K., and a solubility in water less than 0.001.

Figure 8:
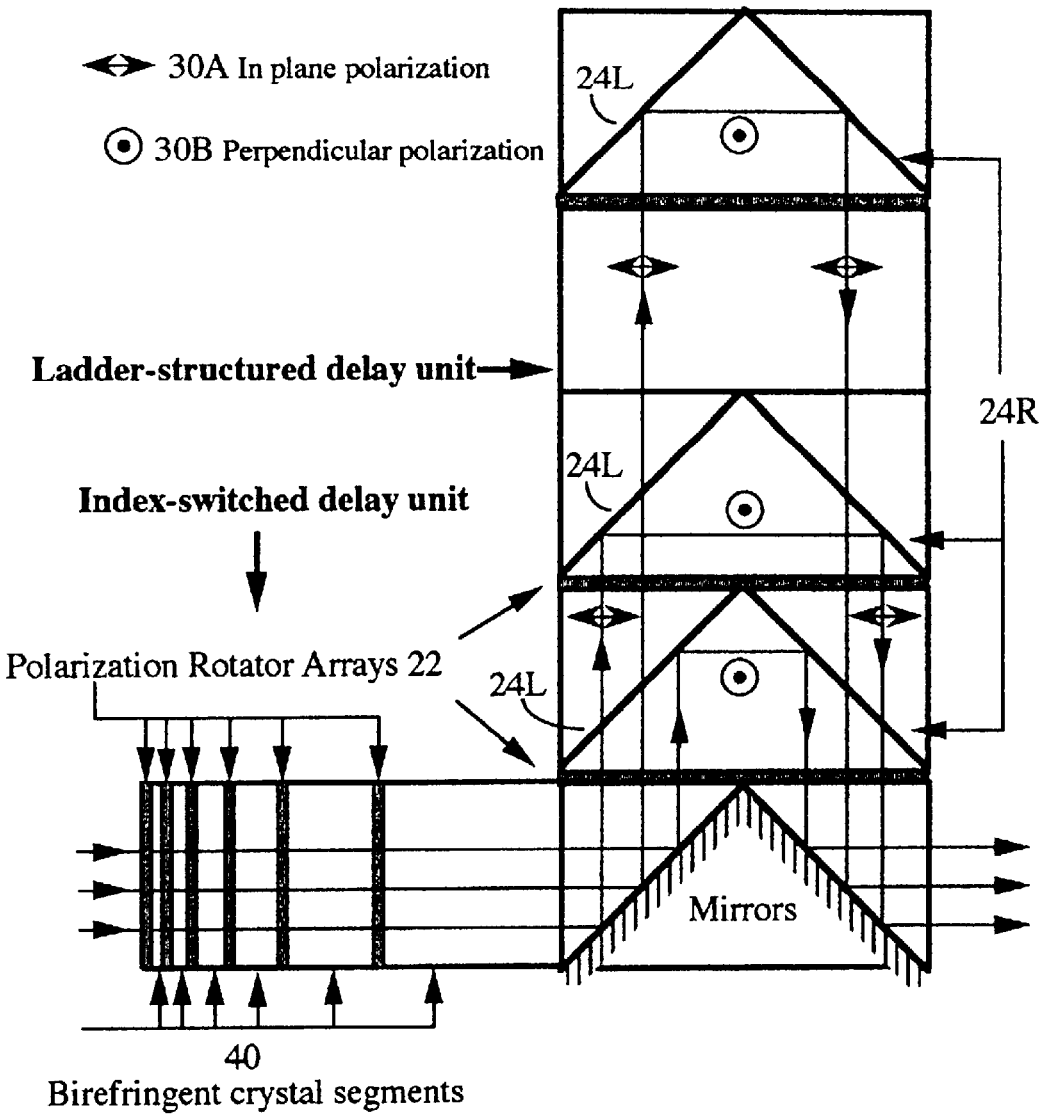
FIG. 8 shows cascading an index-switched two dimensional delay device with a ladder-structured two dimensional delay device.

To reduce the cost and to extend the delay range, the index-changing delay elements may be cascaded with a ladder structured path-switching delay device described previously, as shown in FIG. 8. The birefringent crystal segments are used for the less significant bits of high delay resolution and the path switching concept is used for the more significant bits of large delays. This cascaded construction combines the advantages of both techniques and avoids their short comings. The total length of the crystal segments per channel is now reduced to few centimeters.

Figure 9:
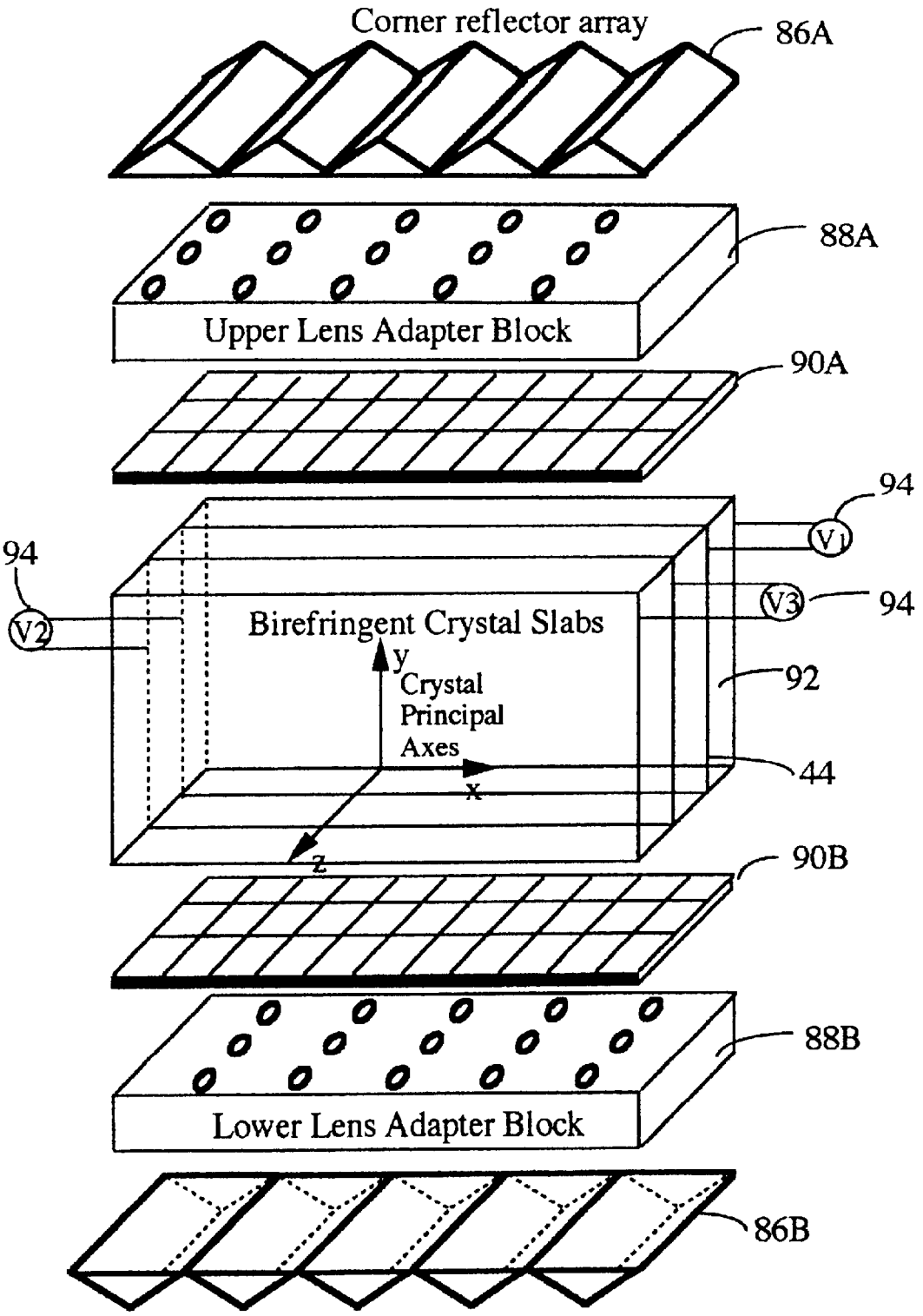
FIG. 9 shows a zig-zag construction of an index-switched variable delay device.

In stead of cutting crystals into many segments, the index-switching time delay unit may also be constructed using slabs of crystal, as shown in FIG. 9. Such a unit consists of slabs of birefringent crystal 92, a upper layer of polarization rotators 90A (which may be individually and independently controlled), an optional lower layer polarization rotators 90B, a upper row of corner reflectors 86A, a lower row of corner reflectors 86B, an optional upper lens array 88A, and an optional lower lens array 88B.

Figure 10A:
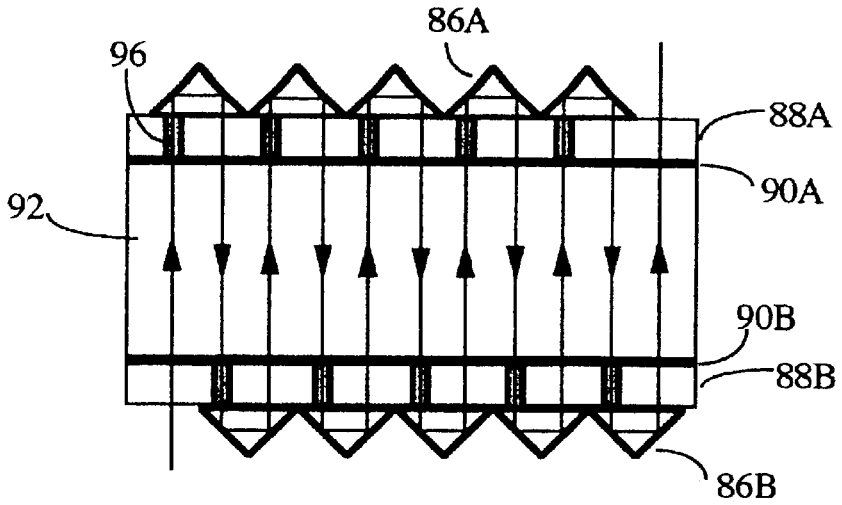
FIG. 10A is a cross section view of the zig-zag construction of the index-switched variable delay device.
Figure 10B:
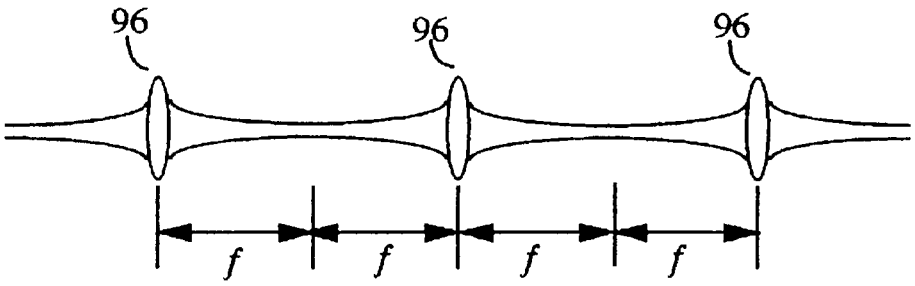
FIG. 10B shows a 4f arrangement of the lenses used to overcome diffraction.
Figure 10C:
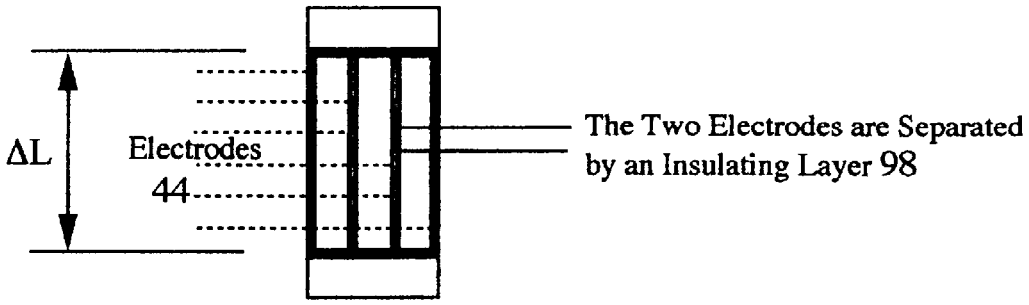
FIG. 10C is another cross section view of the zig-zag construction of the index-switched variable delay device.

FIG. 10A is a cross section view of the device. The crystal slabs are cut along the principal axes (X,Y,Z) of the crystal and light beam propagates along the X (or Y axis). The beam is polarized either in the Z direction or in the Y (or X) direction (two principal directions of the crystal). Similar to the linear construction described in FIG. 5, here the polarization state of the light beam can also be easily switched between Y and Z direction by the 90° polarization rotators and the beam will experience $n_o$ and $n_e$ accordingly. Lenses 96 are used to overcome beam's diffraction and the distance between two consecutive lenses is 2f, where f is the focal length of the lenses, as shown in FIG. 10B. In this construction the height of the crystal determines the smallest delay (delay resolution) and the total number of paths determines the maximum delay. The spacing between the polarization rotators increase successively by a factor of 2 to make the delay line binary, as in FIG. 5. As shown in FIG. 9 and FIG. 10C, many crystal slabs may be stacked together to construct a one dimensional delay array. Compared with the linear construction of FIG. 5, the zig-zag construction uses less crystal. However, it is inherently one dimensional and thus has a lower packing density than that of the linear construction.

Finally, to obtain even finer delay tuning, electrodes 44 can be attached across each crystal slab to apply an electrical field 94 and change the refractive index of the crystal via the electro-optic (or Pockel's) effect of the birefringent crystals, as shown in FIG. 9 and FIG. 10C. The two electrodes on each face of crystal slab 92 can be separated by an insulation layer 98.

In summary, the index switched photonic variable delay device has the properties of high packing density, low loss, easy fabrication, and virtually infinite bandwidth. The device is inherently two dimensional and has a packing density exceeding 25 lines/$cm^2$. The delay resolution of the device can be much less than a femtosecond (one micron in space) and its total delay exceeds 1 nanosecond. The delay accuracy achievable is high, and is only limited by the length accuracy of each crystal segment. The device can also be digitally programmed with low switching power (microwatts per switch or per bit). Such a device is ideal for a beam forming network of a phased array operating at Ka band (~40 GHz) and above frequencies and for millimeter wave transversal filters. In addition, the delay is reversible so that the same delay device can be used for both antenna transmitting and receiving. Finally, this index-switched variable delay device can be cascaded with a ladder-structured variable device to form a new device which combines the advantages of the two individual devices.

Although the description above contains many specificaties, these should not be construed as limiting the scope of the invention but as merely providing illustrations of some of the presently preferred embodiments of this invention. Thus, the scope of the invention should be determined by the appended claims and their legal equivalents, rather than by the examples given.

What is claimed is:

1. An index-switched optical variable delay device for varying a path length of an optical beam, comprising:

A slab of bireftingent crystal having a first birefringent axis and a second birefringent axis, a first array of corner reflectors being placed at a first side of said slab, a second array of corner reflectors being placed at an opposite side of said slab, and a multiple of polarization rotators each independently operable to rotate a first polarization state of an input light beam to a second polarization state which is substantially orthogonal to the first polarization state when being activated and leave the first polarization state unaffected when being de-activated; said two corner reflector arrays being such arranged that the optical beam entering from the first side of the slab towards the opposite side is reflected back by a first corner reflector on the opposite side towards a second corner reflector at the first side; the beam being reflected again by the second corner reflector towards a third corner reflector on the opposite side, and continuing being reflected back and forth across the slab by successive corner reflectors until exiting; the polarization rotators each being placed between the slab and a selected corner reflector.

2. The index-switched optical variable delay device of claim 1 further comprising multiple lenses each having a focal length being placed at a selected position to allow said optical beam to pass through each lens; a distance between two successive lenses being substantially twice said focal length.

3. The index-switched optical variable delay device of claim 1 wherein more than one such device being stacked together to form a multiple channel delay device.

4. The index-switched optical variable delay device of claim 3 wherein a pair of electrodes [being] *are* placed across each slab so that an electric field can be applied to the slab.

5. A method of changing an optical path length of an optical beam comprising the steps of:

placing in a path of said optical beam a first polarization rotator operable to rotate a first polarization state of said optical beam to a second polarization state which is substantially orthogonal to the first polarization state when being activated and leave the first polarization state unaffected when being de-activated, after said first polarization rotator, placing a first [bireftingent] *birefringent* crystal segment having a first birefringent axis and a second birefringent axis;

making said optical beam propagate in said first birefringent crystal segment substantially perpendicularly to said first and second birefringent axes, de-activating said polarization rotator so that said optical beam experiences a first refractive index, activating said polarization rotator to rotate said first polarization state to said second polarization state to make said optical beam experience a second refractive index, connecting multiple birefringent crystal segments with one another, with a polarization rotator sandwiched between any two adjacent crystal segments;

activating and de-activating each polarization rotator independently to make said optical beam experience different refractive indices in each birefringent crystal segment, thereby varying the path length of said optical beam passing through all said birefringent crystal segments.

6. The method of claim 5 wherein a polarization rotator array having multiple polarization rotators is placed in front of each said birefringent crystal segment to accept multiple optical beams.

7. An optical delay device to vary a path length of an optical beam, said delay device comprising:

a first polarization rotator configured to rotate the optical beam to a first polarization state when active and a second polarization state when inactive; and a first birefringent crystal segment having a first end coupled with the first polarization rotator, said first birefringent crystal segment including a first birefringent axis substantially aligned with the first polarization state and a second birefringent axis substantially aligned with the second polarization state.

8. The optical delay device of claim 7 further comprising a second polarization rotator coupled with a second end of said first birefringent crystal segment.

9. The optical delay device of claim 8 further comprising a second birefringent crystal segment having an input end coupled to the second polarization rotator, a first birefringent axis of the second birefringent crystal segment substantially aligned with the first polarization state and a second birefringent axis of the second birefringent crystal segment substantially aligned with the second polarization state.

10. The optical delay device of claim 9 further comprising a plurality of polarization rotators and a plurality of birefringent crystal segments coupled with one another in an alternating order.

11. The optical delay device of claim 10 wherein the optical path difference between said first polarization state and said second polarization state in different birefringent crystal segments differs by a factor of two.

12. The optical delay device of claim 9 further comprising birefringent crystal segments having different birefringences.

13. The optical delay device of claim 9 further comprising a first polarization beamsplitter coupled with the first birefringent crystal segment;

a first external polarization rotator placed between the first polarization beamsplitter and the first birefringent crystal segment;

a second polarization beamsplitter coupled with an output end of the second birefringent crystal segment; and a second external polarization rotator placed between the second polarization beamsplitter and the second birefringent crystal *segment*.

14. The optical delay device of claim 7 wherein said first polarization rotator is fabricated with a material selected from the group consisting of liquid crystals, birefringent crystals, magneto-optic materials, and electro-optic crystals.

15. A multi-channel optical device to independently control path lengths for a plurality of optical beams, the multi-channel optical device comprising:

a first polarization rotator array having at least two polarization rotation elements, each polarization rotation element configured to rotate a corresponding optical beam in the plurality of optical beams to a first polarization state when active and to rotate the corresponding optical beam to a second polarization state when inactive, and a first birefringent crystal segment having a first end coupled with the first polarization rotator array, said first birefringent crystal segment including a first birefringent axis substantially aligned with the first polarization state and a second birefringent axis substantially aligned with the second polarization state.

16. The multi-channel optical delay device of claim 15 further comprising a second polarization rotator array coupled with a second end of said first birefringent crystal segment.

17. The multi-channel optical delay device of claim 16 further comprising a second birefringent crystal segment having an input end coupled to the second polarization rotator array, said second birefringent crystal segment including a first birefringent axis of the second birefringent crystal segment substantially aligned with the first polarization state and a second birefringent axis of the second birefringent crystal segment substantially aligned with the second polarization state.

18. The multi-channel optical device of claim 17 further comprising a plurality of polarization rotator arrays and a plurality of birefringent crystal segments coupled with one another in an alternating order.

19. The multi-channel optical device of claim 18 wherein an optical path difference between said first polarization state and said second polarization state in different birefringent crystal segments increases by a factor of two.

20. The multi-channel optical device of claim 18 wherein different birefringent crystal segments having different birefringences.

21. The multi-channel optical device of claim 17 further comprising:

a photodetector array having multiple photodetectors each operable to convert an optical signal to an electrical signal;

an electrical signal combiner having multiple input ports and operable to combine the electrical signals from the multiple photodetectors;

said photodetector array being coupled to an output end of the second birefringent crystal segment with each photodetector receiving an optical signal from each channel;

said electrical signal combiner with each input port being coupled to a corresponding photodetector on the photodetector array.

22. The multi-channel optical delay device of claim 17 further comprising:

a first polarization beamsplitter coupled with an input end of the optical delay device;

a first external polarization rotator array placed between the first polarization beamsplitter and the input end of the optical delay device;

a second polarization beamsplitter coupled with an output end of the second birefringent crystal segment; and a second external polarization rotator array placed between the second polarization beamsplitter and the second birefringent crystal segment.

23. The multi-channel optical device of claim 15 further comprising:

A pair of electrodes being placed across said first birefringent crystal segment for applying a voltage in a predetermined direction.

24. The multi-channel optical device of claim 15 wherein an output end of the device being connected to an input end of a different multi-channel variable delay device, with each channel of the device aligned with each channel of the different device to form a cascaded multi-channel variable delay device.

25. A method of changing an optical path length of an optical beam comprising the steps of:

receiving the optical beam in a first polarization rotator;

adjusting the first polarization rotator to polarize the optical beam to a first desired polarization, and transmitting the output of said first polarization rotator through a first segment of birefringent crystal having a first birefringent axis and a second birefringent axis;

inputting the optical beam output by said first segment of birefringent crystal into a second polarization rotator;

adjusting the second polarization rotator to polarize the optical beam to a second desired polarization, and transmitting the output of said second polarization rotator through a second segment of birefringent crystal having a first birefringent axis and a second birefringent axis.

26. The method of claim 25 wherein said first and second polarization rotators are selected from the group consisting of *a* liquid crystal polarization rotator, *a* half-wave plate polarization rotator, *a* magneto-optic polarization rotator, and *an* electro-optic crystal based polarization rotator.

27. The method of claim 25 further comprising the steps of:

determining the desired optical path length;

applying a first activation signal to set the first polarization rotator and a second activation signal to set the second polarization rotator; said first and second activation signals determined by desired optical path lengths calculated in the determining step.

28. The method of claim 25 wherein one of the first desired polarization and the second desired polarization is aligned with one of the first and the second birefringent axes.

29. The method of claim 25 wherein each of the first polarization rotator and the second polarization rotator has at least two independent polarization rotating elements to accept at least two optical beams.

30. An optical delay device for varying a path length of an optical beam comprising:

a birefringent crystal including a first birefringent axis and a second birefringent axis;

a first corner reflector coupled to a first side of the birefringent crystal at a first position;

a polarization rotator coupled to the birefringent crystal and positioned to receive the optical beam from the first corner reflector, the polarization rotator configured to switch the polarization of the optical beam between a first polarization state and a second polarization state;

a second corner reflector positioned to reflect the optical beam output by the polarization rotator back into said birefringent crystal.

*31. An index-switched optical variable delay device for varying a path length of an optical beam, comprising:*

*a slab of a birefringent material having a first birefringent axis and a second birefringent axis, a first array of corner reflectors being placed at a first side of said slab, a second array of corner reflectors being placed at an opposite side of said slab, and a multiple of polarization rotators each independently operable to rotate a first polarization state of an input light beam to a second polarization state which is substantially orthogonal to the first polarization state when being activated and leave the first polarization state unaffected when being de-activated; said two corner reflector arrays being such arranged that the optical beam entering from the first side of the slab towards the opposite side is reflected back by a first corner reflector on the opposite side towards a second corner reflector at the first side; the beam being reflected again by the second corner reflector towards a third corner reflector on the opposite side, and continuing being reflected back and forth across the slab by successive corner reflectors until exiting; the polarization rotators each being placed between the slab and a selected corner reflector.*

*32. The index-switched optical variable delay device of claim 31, further comprising multiple lenses each having a focal length being placed at a selected position to allow said optical beam to pass through each lens; a distance between two successive lenses being substantially twice said focal length.*

*33. The index-switched optical variable delay device of claim 31, wherein more than one such device being stacked together to form a multiple channel delay device.*

*34. The index-switched optical variable delay device of 33, wherein a pair of electrodes are placed across each slab so that an electric field can be applied to the slab.*

*35. A method of changing an optical path length of an optical beam comprising the steps of:*

*placing in a path of said optical beam a first polarization rotator operable to rotate a first polarization state of said optical beam to a second polarization state which is substantially orthogonal to the first polarization state when being activated and leave the first polarization state unaffected when being de-activated,*

*after said first polarization rotator, placing a first birefringent material segment having a first birefringent axis and a second birefringent axis;*

*making said optical beam propagate in said first birefringent material segment substantially perpendicularly to said first and second birefringent axes,*

*de-activating said polarization rotator so that said optical beam experiences a first refractive index,*

*activating said polarization rotator to rotate said first polarization state to said second polarization state to make said optical beam experience a second refractive index,*

*connecting multiple birefringent material segments with one another, with a polarization rotator sandwiched between any two adjacent material segments; and*

*activating and de-activating each polarization rotator independently to make said optical beam experience different refractive indices in each birefringent material segment, thereby varying the path length of said optical beam passing through all said birefringent material segments.*

*36. The method of claim 35 wherein a polarization rotator array having multiple polarization rotators is placed in front of each said birefringent material segment to accept multiple optical beams.*

*37. An optical delay device to vary a path length of an optical beam, said delay device comprising:*

*a first polarization rotator configured to rotate the optical beam to a first polarization state when active and a second polarization state when inactive; and*

*a first birefringent material segment having a first end coupled with the first polarization rotator, said first birefringent material segment including a first birefringent axis substantially aligned with the first polarization state and a second birefringent axis substantially aligned with the second polarization state.*

*38. The optical delay device of claim 37, further comprising a second polarization rotator coupled with a second end of said first birefringent material segment.*

*39. The optical delay device of claim 38, further comprising a second birefringent material segment having an input end coupled to the second polarization rotator, a first birefringent axis of the second birefringent material segment substantially aligned with the first polarization state and a second birefringent axis of the second birefringent material segment substantially aligned with the second polarization state.*

*40. The optical delay device of claim 39, further comprising a plurality of polarization rotators and a plurality of birefringent material segments coupled with one another in an alternating order.*

*41. The optical delay device of claim 30, wherein the optical path difference between said first polarization state*

*and said second polarization state in different birefringent material segments differs by a factor of two.*

*42. The optical delay device of claim 40, wherein different birefringent material segments having different birefringences.*

*43. The optical delay device of claim 39, further comprising:*

*a first polarization beamsplitter coupled with the first birefringent material segment;*

*a first external polarization rotator placed between the first polarization beamsplitter and the first birefringent material segment;*

*a second polarization beamsplitter coupled with an output end of the second birefringent material segment; and*

*a second external polarization rotator placed between the second polarization beamsplitter and the second birefringent material segment.*

*44. The optical delay device of claim 37, wherein said first polarization rotator is fabricated with a material selected from the group consisting of liquid crystals, birefringent crystals, magneto-optic materials, and electro-optic elements.*

*45. A multi-channel optical device to independently control path lengths for a plurality of optical beams, the multichannel optical device comprising:*

*a first polarization rotator array having at least two polarization rotation elements, each polarization rotation element configured to rotate a corresponding optical beam in the plurality of optical beams to a first polarization state when active and to rotate the corresponding optical beam to a second polarization state when inactive; and*

*a first birefringent material segment having a first end coupled with the first polarization rotator array, said first birefringent material segment including a first birefringent axis substantially aligned with the first polarization state and a second birefringent axis substantially aligned with the second polarization state.*

*46. The multi-channel optical delay device of claim 45, further comprising a second polarization rotator array coupled with a second end of said first birefringent material segment.*

*47. The multi-channel optical delay device of claim 46, further comprising a second birefringent material segment having an input end coupled to the second polarization rotator array, said second birefringent material segment including a first birefringent axis of the second birefringent material segment substantially aligned with the first polarization state and a second birefringent axis of the second birefringent material segment substantially aligned with the second polarization state.*

*48. The multi-channel optical device of claim 47, further comprising a plurality of polarization rotator arrays and a plurality of birefringent material segments coupled with one another in an alternating order.*

*49. The multi-channel optical device of claim 48, wherein an optical path difference between said first polarization state and said second polarization state in different birefringent material segments increases by a factor of two.*

*50. The multi-channel optical device of claim 48, wherein different birefringent material segments having different birefringences.*

*51. The multi-channel optical device of claim 47, further comprising:*

*a photodetector array having multiple photodetectors each operable to convert an optical signal to an electrical signal;*

*an electrical signal combiner having multiple input ports and operable to combine the electrical signals from the multiple photodetectors;*

*said photodetector array being coupled to an output end of the second birefringent material segment with each photodetector receiving an optical signal from each channel; and*

*said electrical signal combiner with each input port being coupled to a corresponding photodetector on the photodetector array.*

*52. The multi-channel optical delay device of claim 47, further comprising:*

*a first polarization beamsplitter coupled with an input end of the optical delay device;*

*a first external polarization rotator array placed between the first polarization beamsplitter and the input end of the optical delay device;*

*a second polarization beamsplitter coupled with an output end of the second birefringent material segment; and*

*a second external polarization rotator array placed between the second polarization beamsplitter and the second birefringent material segment.*

*53. The multi-channel optical device of claim 45, further comprising:*

*a pair of electrodes being placed across said first birefringent material segment for applying a voltage in a predetermined direction.*

*54. The multi-channel optical device of claim 45, wherein an output end of the device being connected to an input end of a different multi-channel variable delay device, with each channel of the device aligned with each channel of the different device to form a cascaded multi-channel variable delay device.*

*55. A method of changing an optical path length of an optical beam, comprising the steps of:*

*receiving the optical beam in a first polarization rotator;*

*adjusting the first polarization rotator to polarize the optical beam to a first desired polarization, and transmitting the output of said first polarization rotator through a first segment of a birefringent material having a first birefringent axis and a second birefringent axis;*

*inputting the optical beam output by said first segment of the birefringent material into a second polarization rotator;*

*adjusting the second polarization rotator to polarize the optical beam to a second desired polarization; and*

*transmitting the output of said second polarization rotator through a second segment of a birefringent material having a first birefringent axis and a second birefringent axis.*

*56. The method of claim 55, wherein said first and second polarization rotators are selected from the group consisting of a liquid crystal polarization rotator, a half-wave plate polarization rotator, a magneto-optic polarization rotator, and an electro-optic element based polarization rotator.*

*57. The method of claim 55, further comprising the steps of:*

*determining the desired optical path length; and*

*applying a first activation signal to set the first polarization rotator and a second activation signal to set the second polarization rotator; said first and second activation signals determined by desired optical path lengths calculated in the determining step.*

*58. The method of claim 55, wherein one of the first desired polarization and the second desired polarization is aligned with one of the first and the second birefringent axes.*

*59. The method of claim 55, wherein each of the first polarization rotator and the second polarization rotator has at least two independent polarization rotating elements to accept at least two optical beams.*

*60. An optical delay device for varying a path length of an optical beam, comprising:*

*a birefringent material including a first birefringent axis and a second birefringent axis;*

*a first corner reflector coupled to a first side of the birefringent material at a first position;*

*a polarization rotator coupled to the birefringent material and positioned to receive the optical beam from the first corner reflector, the polarization rotator configured to switch the polarization of the optical beam between a first polarization state and a second polarization state; and*

*a second corner reflector positioned to reflect the optical beam output by the polarization rotator back into said birefringent material.*

* * * * *